Dec. 16, 1930.  C. L. AGNELL  1,785,430

FLOWER URN

Filed Sept. 9, 1929

Inventor.
Carl Leonard Agnell.
By Dyrenforth, Lee, Chritton and Wiles.
attys.

Patented Dec. 16, 1930

1,785,430

UNITED STATES PATENT OFFICE

CARL LEONARD AGNELL, OF CHICAGO, ILLINOIS

FLOWER URN

Application filed September 9, 1929. Serial No. 391,204.

This invention relates to receptacles for plants and more particularly to urns, boxes and the like for flowers and decorative plants.

One of the objects of the invention is to provide a flower or plant receptacle which will supply water or moisture to the plant within the receptacle gradually as needed and maintain a proper moisture content therein. Another object is to provide reservoir means from which water may pass gradually from the reservoir into the receptacle in which the plant is growing. A further object is to provide controllable means whereby the reservoir may be drained, and drainage means for the plant receptacle. Another object is to provide means for readily cleaning the plant receptacle, or urn. A further object is to provide drainage lines which are carried within the foundation or pedestal of the urn and which carry away the drain water to a point where its discharge will not affect or injure the foundation upon which the base of the urn or pedestal rests. Other objects and advantages will appear as the specification proceeds.

The invention is fully described in the following specification and shown in the accompanying drawing, in which—

Figure 1:
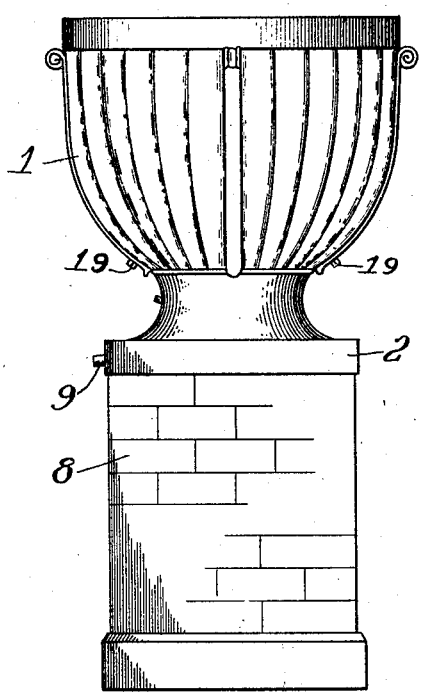
Figure 1 is a view in elevation of an urn or plant receptacle embodying my invention.
Figure 2:
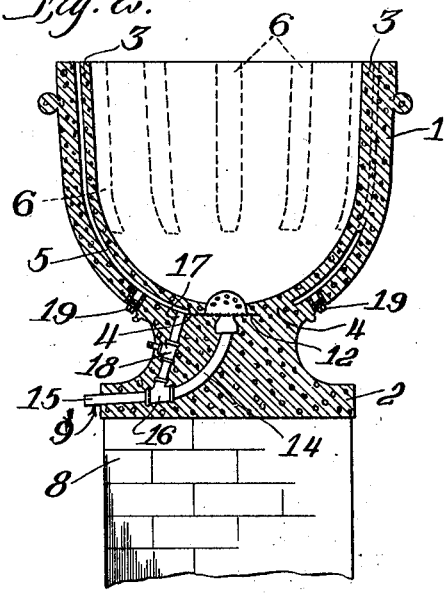
Fig. 2 is a sectional view, the section being taken as indicated at line 2 of Fig. 3.
Figure 3:
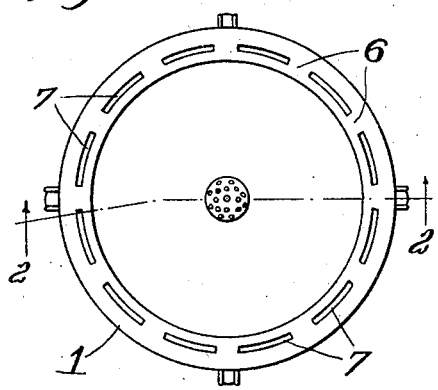
Fig. 3 is a top plan view.
Figure 4:
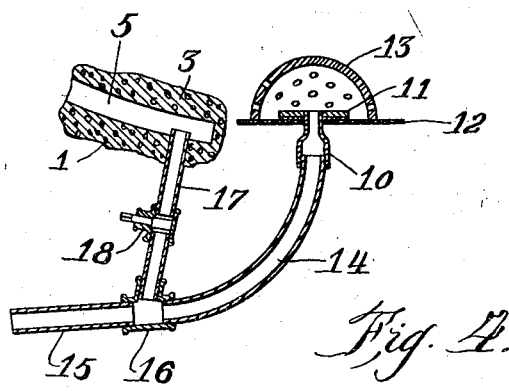
Fig. 4 is an enlarged sectional detail view of the drainage system employed.

In the illustration given, the urn or plant receptacle comprises an outer bowl or receptacle 1 which is provided with a support or pedestal 2; and an inner bowl or receptacle 3.

The outer bowl 1 and pedestal 2 preferably are formed of a waterproof cement or other material adapted to retain water. The inner bowl 3 is preferably formed of a porous cement or other suitable material which will permit water to pass through slowly at a desired rate. The inner bowl 3 is supported upon a short neck 4 preferably of concrete, near the bottom of the outer bowl 1. This support separates the two bowls so as to provide there-between an annular reservoir space 5.

The annular reservoir 5 is preferably broken by concrete or cement fingers 6 which are formed between the two bowls at spaced intervals and which extend downwardly to a point approaching but not reaching, the bottom of the bowl. The spacers or fingers 6 thus divide the annular reservoir 5 in its upper portion into a series of vertical channels 7. The base or pedestal 2 upon which the bowls 1 and 3 are supported is preferably made wide enough to cover the wall 8 or other support upon which the pedestal rests.

The pedestal 1 is preferably formed with a conduit 9 extending therethrough and almost reaching the inner bowl 3. As shown in the illustration, the inner end of conduit 9 is in treaded relation with a nipple 10 which in turn is secured within the inner bowl 3 by means of a nut 11 which threadedly engages the upper end of the nipple. A strip of reinforcing wire 12 or other suitable material is secured upon the nipple at the bottom of the inner urn or bowl 3. The nut 11 is secured upon nipple 10 and preferably a small amount of concrete is placed in the base of the inner urn in order to make the bottom surface flush with the top of nut 11. A strainer 13 is preferably placed over the nut 11 so as to prevent obstructing material from clogging the nipple opening.

In the preferred construction, the conduit 9 comprises an inner member 14 and an outer discharge segment 15. Members 14 and 15 are secured together by a suitable fitting 16. Also secured to fitting 16 is a drain pipe 17 which opens into reservoir 5 and which is provided with a valve 18. The handle of valve 18 extends through an opening in the pedestal 2 and is operable by a key outside of the pedestal. The discharge segment 15 of conduit 9 preferably extends a short distance outside of the base so that the liquid drained from the bowl 3 or reservoir 5 may be discharged away from the supporting wall 8 upon which the urn rests.

In order to clean the reservoir 5, a pair of plug openings may be used, each of these plug openings preferably comprising an internally threaded pipe in threaded relation with a removable plug 19.

In the operation of the device, water is poured within the reservoir openings 7 to fill the reservoir space 5. The water trickles through the porous inner bowl 3 into the soil within the inner bowl and keeps the plant therein supplied with the proper amount of water, excess water being carried away through the drain line 9 and discharged at a point away from the support upon which the pedestal of the urn rests. When it is desired to drain the reservoir 5, valve 18 may be opened and the water drawn away through discharge pipe 15. If it is desired to clean the reservoir 5 to remove obstruction formed therein, one or both of the plugs 19 may be removed and water passed through the reservoir 5 by means of a garden hose or other means.

It will be observed that the urn as described is, in effect, self-watering and provides a means for draining the water at a point where it will not do damage to the support or wall upon which the urn rests. By this means, the disintegrating and other damaging effects of water trickling from a flower receptacle upon the wall or support for the urn, are avoided.

Obviously, it is within the spirit of the invention to equip boxes, vases, bowls, pots, and other receptacles for plants of all kinds, with the means disclosed in this specification for attaining the results indicated. The angular positions of lines 17, 14, and 15 permit ready draining of the liquid.

The strainer 13 is preferably formed of concrete and is provided with a plurality of minute channels or openings inclined upwardly to permit water to pass from the inner bowl 3 into the drain passage while excluding dirt and other obstructions. Also, it is preferred to employ a washer below strainer 13 and nut 11.

It will be observed that with the construction shown, when the base of the urn is smaller than the wall or support upon which the urn rests, the discharge pipe 15 of drain line 9 extends from the side of the base 2 and beyond the edge of the wall or support, thus discharging the drain water at a point where it will not come in contact with the wall or support.

The foregoing detailed description has been given for clearness of understanding only and no unnecessary limitations should be understood therefrom, but the appended claims should be construed as broadly as permissible, in view of the prior art.

I claim:

1. In a device of the character set forth, inner and outer receptacles, the inner receptacle being supported by a pillar within said outer receptacle so as to provide a reservoir space between said receptacles, and spacers between said receptacles dividing said reservoir, said inner receptacle being porous to permit the gradual passing of water therethrough.

2. In a device of the character set forth, an urn having a reservoir formed in its walls and having also an enlarged base, drain lines from the interior of said receptacle and from said reservoir being joined within said base and being provided with a discharge line extending outside of said base and laterally therefrom.

3. In a device of the character set forth, a pair of nested bowls, one of said bowls being supported within the other by a pillar, a base formed integrally with said pillar, and a drain pipe leading through said pillar and base and extending laterally through said base.

4. In a device of the character set forth, a bowl equipped with a solid base formed integrally with the bowl, said base comprising a flared bottom portion adapted to rest upon a support and a neck portion supporting and merging into the bottom wall of the bowl, and a sloping drain pipe extending through the bottom wall of said bowl and the neck and flared bottom of said base, the discharge portion of said drain pipe extending laterally from said base.

5. In a device of the character set forth, a bowl equipped with a solid base cast integrally with the bowl, said base comprising a bottom portion and a neck portion, said neck portion merging into the bottom wall of the bowl, and a sloping drain pipe extending through the bottom wall of said bowl and the neck and bottom of said base, the inlet of said drain pipe being imbedded in the bottom wall of said bowl and the discharge portion of said drain pipe extending laterally from said base.

CARL LEONARD AGNELL.